United States Patent
Suess et al.

(10) Patent No.: US 7,905,612 B2
(45) Date of Patent: Mar. 15, 2011

(54) DISPLAY DEVICE FOR A MOTOR VEHICLE PROVIDED WITH A SWIVELLING INDICATOR HAVING FIRST AND/OR SECOND OPTICAL WAVE GUIDE AREAS

(75) Inventors: Manfred Suess, Remchingen (DE); Heinrich Behrends, Bad Herranalb (DE); Isabel Witzemann, Karlsruhe (DE)

(73) Assignee: Johnson Controls Automotive Electronics GmbH, Remchingen (DE)

( * ) Notice: Subject to any disclaimer, the term of this patent is extended or adjusted under 35 U.S.C. 154(b) by 100 days.

(21) Appl. No.: 12/090,082

(22) PCT Filed: Oct. 13, 2006

(86) PCT No.: PCT/EP2006/009925
§ 371 (c)(1),
(2), (4) Date: Aug. 29, 2008

(87) PCT Pub. No.: WO2007/042322
PCT Pub. Date: Apr. 19, 2007

(65) Prior Publication Data
US 2009/0135580 A1  May 28, 2009

(30) Foreign Application Priority Data
Oct. 14, 2005 (DE) .......... 10 2005 049 721

(51) Int. Cl.
*G01D 11/28* (2006.01)

(52) U.S. Cl. .......... 362/23; 362/28; 362/27; 116/62.1; 116/286

(58) Field of Classification Search .......... 362/23, 362/26, 27, 29, 482, 511, 543, 544, 545, 362/28, 489, 30; 116/286, 288, 287, DIG. 5, 116/DIG. 26, DIG. 36, 62.1–62.4
See application file for complete search history.

(56) References Cited

U.S. PATENT DOCUMENTS

| | | | | |
|---|---|---|---|---|
| 6,302,551 B1 * | 10/2001 | Matumoto | | 362/27 |
| 6,379,015 B2 * | 4/2002 | Wilhelm et al. | | 362/23 |
| 6,490,992 B2 * | 12/2002 | Olbrich et al. | | 116/288 |
| 7,191,730 B2 * | 3/2007 | Araki et al. | | 116/288 |
| 2002/0108555 A1 * | 8/2002 | Breinich et al. | | 116/288 |

FOREIGN PATENT DOCUMENTS

| | | |
|---|---|---|
| DE | 28 38 261 A1 | 3/1979 |
| DE | 28 39 196 A1 | 3/1979 |
| DE | 196 17 553 A1 | 11/1997 |
| DE | 199 04 597 A1 | 10/1999 |
| DE | 101 45 036 A1 | 4/2003 |
| WO | WO 2005085768 A1 * | 9/2005 |
| WO | WO 2006/005821 A1 | 1/2006 |
| WO | WO 2006/024747 A1 | 3/2006 |

* cited by examiner

*Primary Examiner* — Evan Dzierzynski
(74) *Attorney, Agent, or Firm* — Foley & Lardner LLP

(57) ABSTRACT

The invention relates to a motor vehicle display device comprising a display area oriented in a viewing direction, wherein a swiveling indicator rotatable about an axis of rotation is provided in the viewing direction behind the displaying area, a printed circuit board, which is provided with a first lighting device arranged thereon, is positioned in the viewing direction behind the swiveling indicator and a first optical wave guide area enables a first light emitted by the first lighting device to be transmitted to the display area further the swiveling indicator.

11 Claims, 4 Drawing Sheets

Figure 1:
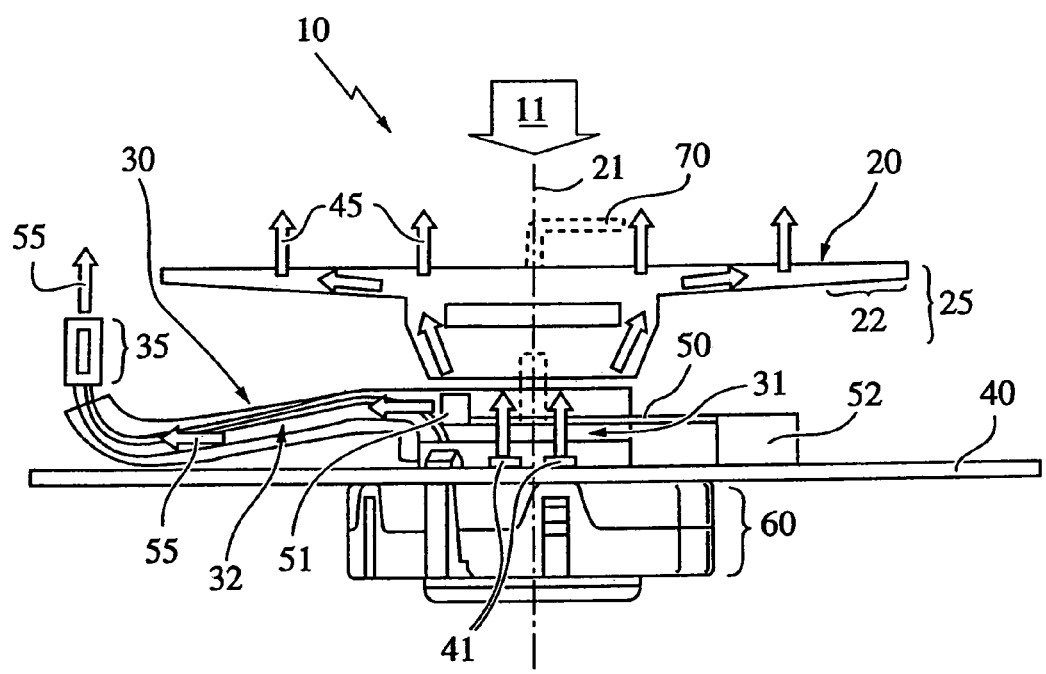

DISPLAY DEVICE FOR A MOTOR VEHICLE PROVIDED WITH A SWIVELLING INDICATOR HAVING FIRST AND/OR SECOND OPTICAL WAVE GUIDE AREAS

The present invention relates to a display apparatus for a motor vehicle with a display region, which faces the viewing direction, an indicator, which is capable of pivoting about an axis of rotation, being provided behind the display region in the viewing direction. In particular, in this case a second illumination device, which is provided so as to be fixed directly or indirectly to the pivotable indicator, is provided, the indicator having a second light guide region for the transmission of second light emerging from the second illumination device.

Such a display apparatus is generally known. For example, the German laid-open specification DE 199 04 597 A1 has disclosed a display apparatus for a motor vehicle, a dial and an indicator arranged behind it in the viewing direction being provided, the indicator being illuminated by means of a light source, which is arranged behind the indicator in the viewing direction, and the indicator acting as a fiberoptic element. The indicator illumination can in this case have a light source which is connected to the indicator in such a way that it is fixed against rotation. One disadvantage here is the fact that the indicator is provided entirely for the transport of light through the indicator and the known display apparatus only makes it possible to use the indicator for the transport of light for the indicator illumination.

The object of the present invention is to provide a display apparatus which allows for a multiple use of the indicator, which furthermore can be produced in a simple and cost-effective manner and which in particular also has a low installation depth as a result of the multiple use of the indicator, with the result that, overall, it can be produced so as to be very compact and therefore allows for easy fitting in a vehicle.

This object is achieved by a display apparatus for a motor vehicle with a display region, which faces the viewing direction, an indicator, which is capable of pivoting about an axis of rotation, being provided behind the display region in the viewing direction, a second illumination device, which is provided so as to be fixed directly or indirectly to the pivotable indicator, being provided, the indicator having a second light guide region for the transmission of second light emerging from the second illumination device, a printed circuit board with a first illumination device provided thereon being provided behind the pivotable indicator in the viewing direction, the pivotable indicator having a first light guide region for the transmission of first light emerging from the first illumination device to the display region and/or to an outer edge of the display region. As a result, it is advantageously possible in accordance with the invention for the pivotable indicator, which is provided behind the display region, to be capable of pivoting about the axis of rotation and nevertheless for the display region to be illuminated by the illumination device, which is fitted behind the pivotable indicator. This makes it possible for contact to be made with the illumination device or for the illumination device to be driven in a very simple and robust manner in accordance with the invention by means of a printed circuit board, which is located behind the pivotable indicator. As a result of the second illumination device and the second light guide region for the transmission of second light emerging from the second illumination device it is possible even to make the position of the pivotable indicator visible by virtue of the fact that, for example in darkness, the tip of this pivotable indicator is illuminated and therefore its position can be identified by a user of the display apparatus. It is hereby furthermore possible in accordance with the invention for the illumination of the pivotable indicator or its tip by means of the second illumination device to be possible in a particularly efficient manner because the second illumination device is fixedly connected to the pivotable indictor and can therefore be positioned optimally with respect to the second light guide region. According to the invention, it is preferred that the second illumination device is provided so as to be fixed indirectly to the pivotable indicator, namely in particular is fixed to a flexible printed circuit board, which for its part is connected (directly) to the pivotable indicator or else is connected only indirectly to the pivotable indicator.

The object according to the invention is furthermore achieved by a display apparatus for a motor vehicle with a display region, which faces the viewing direction, an indicator, which is capable of pivoting about an axis of rotation, being provided behind the display region in the viewing direction, a second illumination device, which is provided so as to be fixed directly or indirectly to the pivotable indicator, being provided, the indicator having a second light guide region for the transmission of second light emerging from the second illumination device, a first illumination device, which is likewise provided so as to be fixed directly or indirectly to the pivotable indicator, being provided, the transport of first light emerging from the first illumination device to the display region and/or to an outer edge of the display region being provided. As a result, it is advantageously possible to position both the first and the second illumination device optimally for light transport with respect to the respective point to be illuminated. It is hereby furthermore possible in accordance with the invention for the illumination of the pivotable indicator or its tip by means of the second illumination device to be possible in a particularly efficient manner because the second illumination device is fixedly connected to the pivotable indicator. According to the invention, it is preferred that the first and second illumination device is provided so as to be fixed indirectly to the pivotable indicator, namely in particular is fixed to a flexible printed circuit board, which for its part is connected (directly) to the pivotable indicator or else is connected only indirectly to the pivotable indicator.

According to the invention, the object is further achieved by a display apparatus for a motor vehicle with a display region, which faces the viewing direction, an indicator, which is capable of pivoting about an axis of rotation, being provided behind the display region in the viewing direction, a printedcircuit board with a first illumination device provided thereon being provided behind the pivotable indicator in the viewing direction, the pivotable indicator having a first light guide region for the transport of first light emerging from the first illumination device to the display region and/or to an outer edge of the display region, the indicator having a second light guide region for the transmission of first light emerging from the first illumination device or for the transmission of second light emerging from a second illumination device. As a result, it is advantageously possible in accordance with the invention for the pivotable indicator, which is provided behind the display region, to be capable of pivoting about the axis of rotation and nevertheless for the display region to be illuminated by the illumination device, which is fitted behind the pivotable indicator. This makes it possible for contact to be made with the illumination device or for the illumination device to be driven in a very simple and robust manner in accordance with the invention by means of a printed circuit board, which is located behind the pivotable indicator. In particular, when using only the first illumination device it is possible for both the pivotable indicator and the display region to be illuminated by the first illumination device.

It is furthermore preferred that the second illumination device, which is provided so as to be fixed directly or indirectly to the pivotable indicator, or the first and second illumination devices, which are provided so as to be fixed directly or indirectly to the pivotable indicator, is/are provided in such a way that electrical contact is made with it/them by means of a contact-making means, in particular a flexible printed circuit board, which compensates for the pivoting movement of the pivotable indicator about the axis of rotation. This makes it possible for the illumination device, which is connected to the indicator in such a way that it is fixed against rotation, or the illumination devices which are connected to the indicator in such a way that they are fixed against rotation, to be capable of being connected in optimum fashion to, for example, a printed circuit board in the display apparatus.

It is furthermore preferred that a printed circuit board is provided behind the pivotable indicator in the viewing direction, the contact-making means being provided so as to be mechanically connected to the printed circuit board by means of a plug-type connection, in particular an LIF (low insertion force) plug-type connection or a ZIF (zero insertion force) plug-type connection. This makes it possible for the display apparatus to be assembled in a manner which is very simple and rapid and cost-effective, because only one plug-type connection needs to be produced between the flexible printed circuit board and the printed circuit board for the purpose of connecting the second illumination device.

In accordance with the invention, it is furthermore preferred that the first illumination device is arranged radially further inward relative to the axis of rotation, and that the second illumination device is arranged radially further outward relative to the axis of rotation. This makes it possible, by means of illumination devices being arranged in a corresponding manner on the printed circuit board or in the direct vicinity of the printed circuit board, to arrive at a very efficient light distribution which makes optimum illumination of the display apparatus and its various parts, which in particular are provided so as to be moveable with respect to one another, possible without the design, in particular as regards a plurality of printed circuit boards, being complicated to an unnecessarily great extent. In particular, by means of such an arrangement of the illumination devices it is possible for those illumination devices which are intended to transport light comparatively far forward toward the viewer (i.e. in the opposite direction to the viewing direction) not to be impeded by the movement of moveable elements (for example pivotable indicators) which are arranged, for example, between such illumination devices and the display region.

In addition, it is preferred that a further indicator, which is likewise capable of pivoting about the axis of rotation, is provided in front of the display region in the viewing direction. As a result, it is possible in accordance with the invention for two values to be indicated, for example the speed and a predetermined speed, for example of a cruise control system or the like, to be represented simultaneously on the display apparatus.

In addition it is preferred that the indicator and the further indicator are provided so as to be capable of pivoting about the axis of rotation independently of one another. This allows for a particularly simple display of the various information on the display apparatus which is comprehensible to a user.

In addition, it is preferred that the display region is a dial. In particular, the display apparatus is used for displaying the speed of a vehicle or else for displaying the engine speed of a vehicle. Further examples of information to be displayed are a tank display together with a display of the instantaneous consumption or other displays. In this case, the display by means of a dial has proven successful since this particularly complies with the ergonomic requirements in driving since a driver should not be overtaxed by an excessively large number of different information elements during the journey.

In addition, it is preferred that the first illumination device and/or the second illumination device comprises one or more light-emitting diodes. This makes a particularly robust implementation of the display apparatus possible. Furthermore, a particularly cost-effective and easy-to-produce display apparatus is possible, it furthermore being possible for a color differentiation of the display apparatus to be possible using light-emitting diodes which can emit light in different colors and/or by the combination of a plurality of light-emitting diodes, which are each always capable of representing the same colors, but with these colors being different from one another, it not only being possible for this color differentiation to be provided randomly but also for it to change dynamically, for example if a value to be displayed exceeds or falls below a critical threshold.

Exemplary embodiments of the invention are illustrated in the drawings and explained in more detail in the description below.

Figure 2:
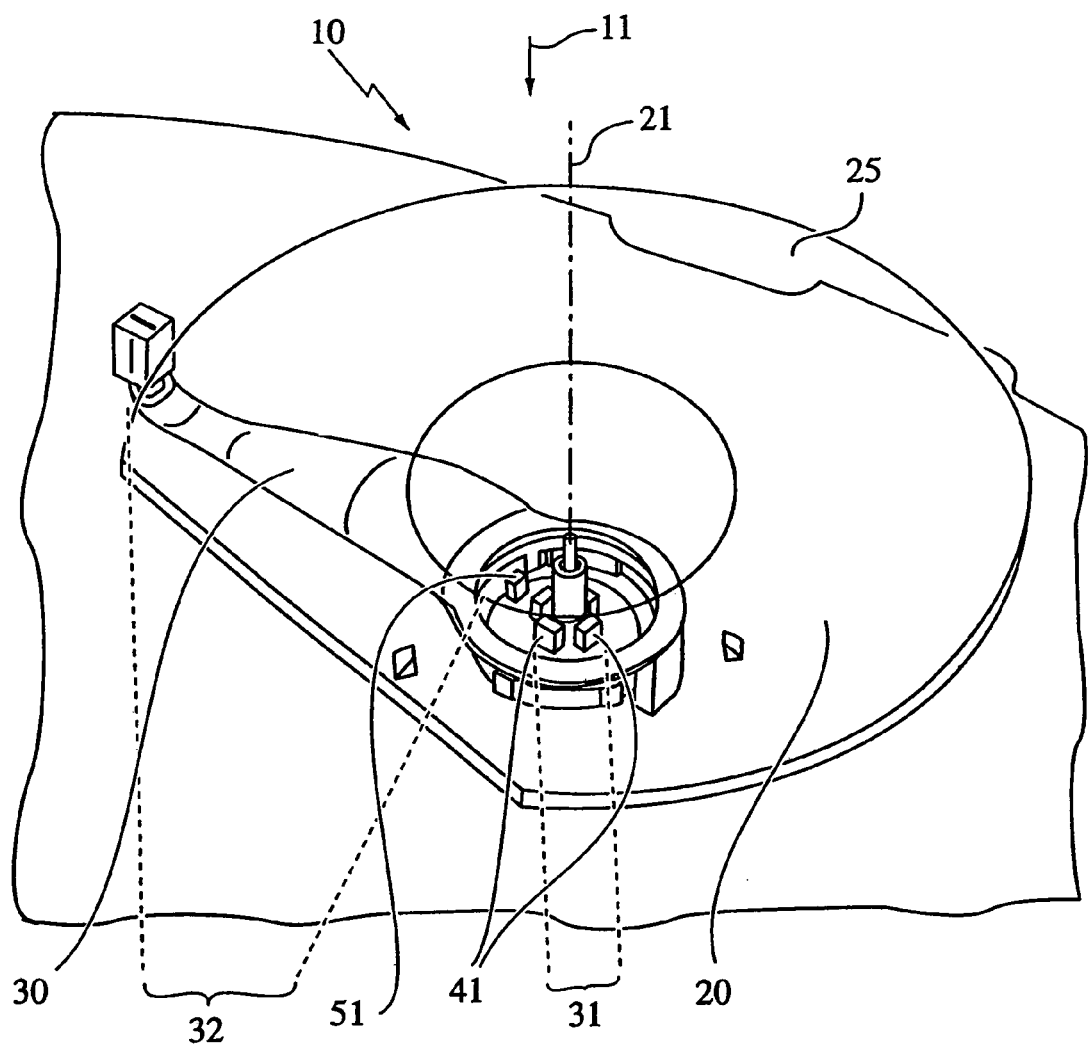
Figure 3:
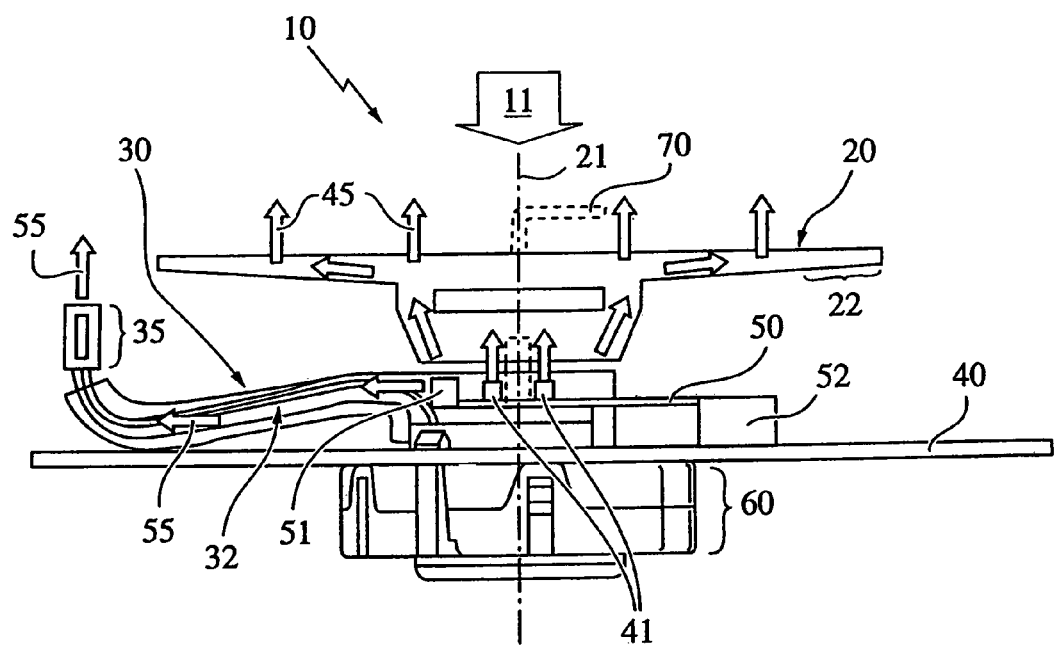
Figure 4:
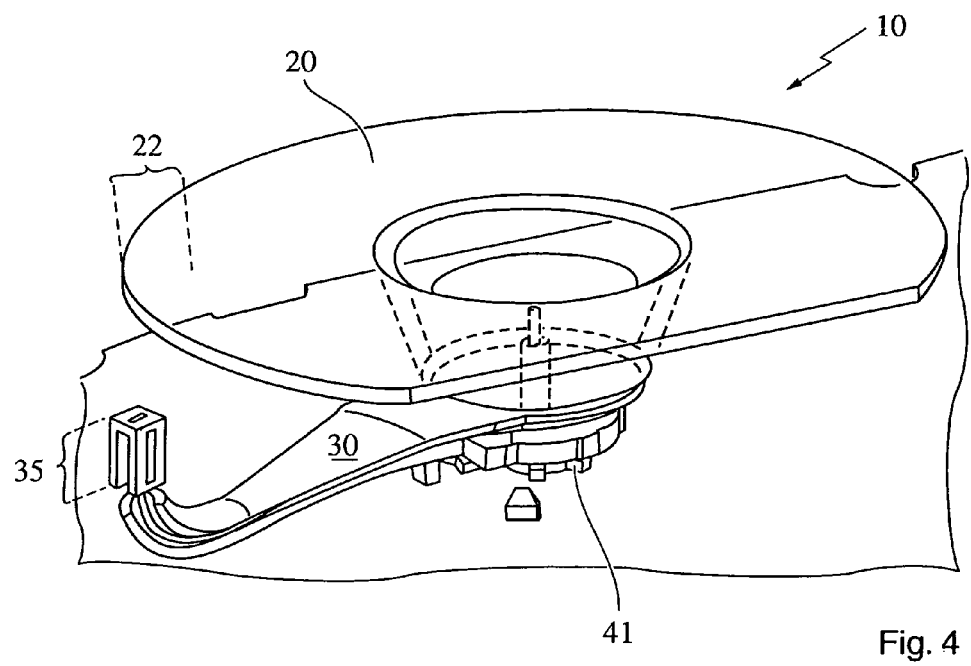
Figure 5:
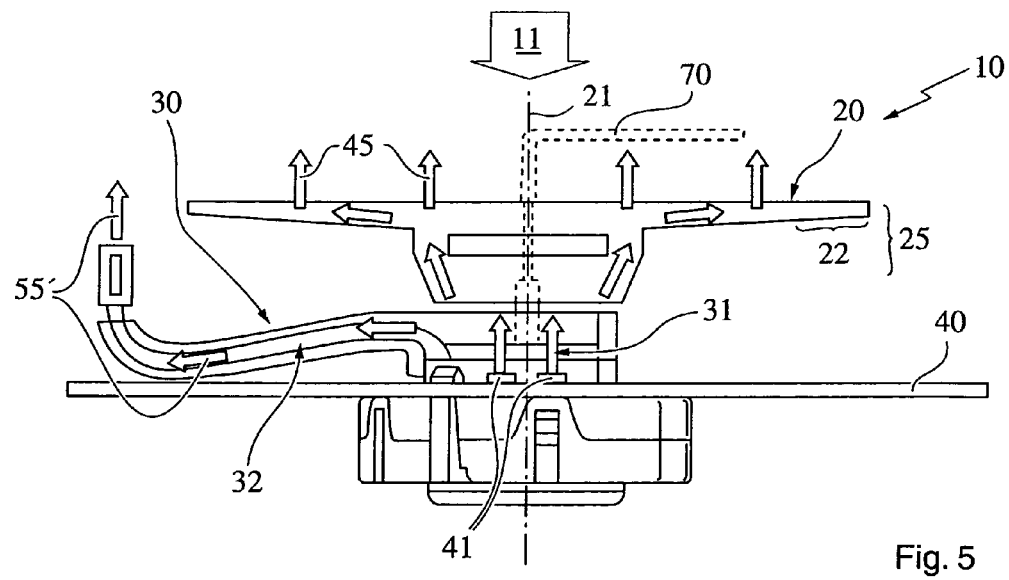

FIG. 1 shows a sectional illustration through a first embodiment of the display apparatus according to the invention, FIG. 2 shows a perspective illustration of part of the first embodiment of the display apparatus, FIG. 3 shows a sectional illustration through a second embodiment of the display apparatus according to the invention, and FIGS. 4 and 5 show a perspective illustration and a sectional illustration, respectively, through a third embodiment of the display apparatus according to the invention.

FIG. 1 depicts a first embodiment of a display apparatus 10 according to the invention for a motor vehicle (not illustrated). FIG. 3 depicts a second embodiment of the display apparatus 10 according to the invention. In both embodiments, the display apparatus 10 has a printed circuit board 40, an indicator 30, which is capable of pivoting about an axis of rotation 21, and a display region 20. The display region 20 is provided so as to be in particular substantially circular and is centered about the axis of rotation 21. The indicator 30, which is capable of pivoting about the axis of rotation 21, runs in a central (radially inner) region approximately at right angles with respect to the axis of rotation 21 and therefore approximately parallel to the display region 20. In a radially outer region, the pivotable indicator 30 extends radially outward from the outer edge 22 of the display region 20, substantially at right angles, with the result that the radially outer region of the pivotable indicator 30, when viewed from a viewing direction 11, is visible radially on the outside at the display region 20. It is also possible (but not illustrated) for the pivotable indicator 30 to reach no further radially than the outer edge 22 of the display region 20. When viewed from the viewing direction 11, the design of the display apparatus 10 is provided in such a way that the display region 20, then the pivotable indicator 30 and subsequently the printed circuit board 40 are provided in a first plane (closer to the viewing direction 11).

In both embodiments of the display apparatus 10 according to the invention, a second illumination device 51 is provided so as to be fixed or is provided so as to be connected to the pivotable indicator 30. The second illumination device 51 injects second light 55 into a light guide region of the pivotable indicator 30, this light guide region also being referred to as the second light guide region 32 of the pivotable indicator

30. The second light guide region 32 is provided in the pivotable indicator 30, in particular radially on the outside, and is used for the conduction or for the transmission of the second light 55 to an outer region (which is denoted by the reference symbol 35 in FIG. 1) of the pivotable indicator 30. The outer region 35 of the indicator 30 is visible to a user of the display apparatus 10 from the viewing direction 11 or else the outer region 35 of the indicator 30 is hidden (not illustrated) and is only visible in the switched-on state of the second illumination device 51. The second light 55 can therefore be seen by such a user of the display apparatus 10. According to the invention, the second illumination device 51 is controlled by means of a contact-making means 50, which compensates for the pivoting movement of the pivotable indicator 30 about the axis of rotation 21. For this purpose, the compensating contact-making means 50 is implemented, for example, as a flexible printed circuit board 50, electrical contact being made between said flexible printed circuit board 50 and the printed circuit board 40 in particular by means of a plug-type connection 52. In this case, the plug-type connection is in particular an LIF plug or ZIF plug.

In the first embodiment (FIG. 1), a first illumination device 41 is provided on the printed circuit board 40, by means of which illumination device 41 first light 45 is emitted in the direction toward the display region 20. In this case, the first light 45 needs to traverse the plane of the pivotable indicator 30. This is implemented in accordance with the invention in such a way that, in addition to the second light guide region 32, a first light guide region 31 is provided in the indicator 30, through which light guide region 31 the first light 45 is transported from the first illumination device 41 in the direction toward the display region 20. In accordance with the invention, the first light guide region 31 is in particular provided as a central region of the pivotable indicator 30 which is provided so as to be centered about the axis of rotation 21.

In the second embodiment (FIG. 3), the first illumination device 41 is likewise provided so as to be connected to the pivotable indicator 30 in such a way that it is fixed against rotation. In particular, it is preferred that the first illumination device 41, as illustrated in FIG. 3, is arranged above or on the upper side or on that side of the pivotable indicator 30 which faces the indicator region 20. It is then possible in a particularly simple manner for the first light 45 emerging from the first illumination device 41 to be guided or transported to the display region 20 and/or to the outer edge 22 of the display region 20.

In both embodiments, the display apparatus 10 has, for the transport or for the transmission of the first light 45 starting from a plane above the central part of the pivotable indicator 30, a fiberoptic element 25 which is also referred to below as a disk-like light guide 25. According to the invention, it is possible for the display region 20 to be implemented by a display layer or a sheet layer, which is applied to the disk-like light guide 25, it being possible for example for scale marks or the like to be implemented on the sheet (not illustrated) which can also be seen in darkness if the first light 45 emerges from the disk-like light guide 25 in the direction toward the display region 20 or at the edge thereof. In the embodiment of the display region 20 and the disk-like light guide 25, the invention can either provide that the two are provided so as to be directly adjacent to one another and/or connected, for example adhesively bonded or fixed in some other way, or else that the two are provided so as to be spaced apart from one another, for example for the display region 20 is arranged at a comparatively short distance (so as to avoid excessive stray losses) above (i.e. offset in the direction toward the viewing direction 11) the disk-like light guide 25.

In both embodiments, a motor 60 is arranged below the printed circuit board 40. By means of the motor 60 it is possible to rotate both the pivotable indicator 30 and a further indicator, which is merely indicated by the reference symbol 70 in FIGS. 1 and 3, independently of one another about the axis of rotation. In accordance with the invention it is hereby possible for a multiplicity of items of information to be represented or displayed to a user by means of the display apparatus 10, in particular the speed and a desired speed or a predetermined speed, for example of a cruise control system, a tank content display and an instantaneous consumption display or the like.

FIG. 2 illustrates a schematic perspective illustration of the first embodiment of the display apparatus 10 or parts of it. The figure shows that the display region 20 or the disk-like light guide 25 is provided so as to be substantially round. Furthermore, the display region is provided so as to be centered substantially about the axis of rotation 21. The pivotable indicator 30 has the first light guide region 31 in a central region, which is arranged around the axis of rotation 21, and furthermore the second light guide region 32 in a radially outer region of the pivotable indicator 30. In the exemplary embodiment shown in FIG. 2, the first illumination device 41 is implemented by means of four light-emitting diodes, which are arranged around the axis of rotation 21 on the printed circuit board 40 (not illustrated in FIG. 2) in the region of the first light guide region 31. This means that the display region 20 is illuminated around the axis of rotation 21 substantially uniformly by the light-emitting diodes of the first illumination device 41, with the result that a uniform impression is realized for a user of the display apparatus 10.

The pivotable indicator 30 is in particular produced substantially from a transparent material, for example PMMA (polymethyl methacrylate), or is produced in such a way that it comprises transparent material.

The invention furthermore provides that the further indicator 70 is likewise illuminated by the first illumination device 41 or that the first light 45 is also used for illuminating the further indicator 70. In accordance with the invention, it can furthermore also be provided that the first illumination device 41 comprises two groups of light-emitting diodes or generally light sources, the first group of the first illumination device 41 only illuminating the display region 20, and the second group of the first illumination device 41 only illuminating the further indicator 70. This makes it possible to illuminate the further indicator 70 and the display region 20 differently, for example in different colors or the like. With such a separate illumination of the display region 20, on the one hand, and the further indicator 70, on the other hand, via the first or second group of light sources of the first illumination device 41, the invention in particular provides (but this is not illustrated in the figures) that the second group of light sources is provided so as to be arranged on the inside, i.e. closer to the axis of rotation 21, when viewed in the radial direction, and that the first group of light sources is provided so as to be arranged on the outside, i.e. further away from the axis of rotation 21, when viewed in the radial direction. However, this different illumination of the display region 20 and the further indicator 70 is not essential in accordance with the invention. It can also be provided, as described at the outset, that both the display region 20 and the further indicator 70 are illuminated substantially in a similar manner, i.e. in the same color, by means of the first illumination device 41. In accordance with the invention, it is possible both in the case of the first illumination device 41 and in the case of the second illumination device 51 for only one or else a plurality of light-emitting diodes or other light sources to be used.

The flexible printed circuit board 50 is in particular provided as a so-called flex circuit board and comprises metallic conductor tracks which are embedded, for example, in a plastic matrix. Such a flexible printed circuit board 50 extends (in the unbent state) in particular in one plane and is fitted in accordance with the invention in or on the display apparatus 10 in such a way that the flexible printed circuit board 50, at least in a subregion, is aligned in such a plane which is substantially parallel to the axis of rotation 21. This makes it possible for the flexibility of the contact-making means 50 to compensate for the pivoting movement of the pivotable indicator 30.

FIGS. 4 and 5 illustrate, schematically, a perspective illustration (FIG. 4) and a sectional illustration (FIG. 5) through a third embodiment of the display apparatus according to the invention.

In the third embodiment as well, the display apparatus 10 has the printed circuit board 40, the indicator 30, which is capable of pivoting about the axis of rotation 21, and the display region 20. In the third embodiment as well, the display region 20 is provided so as to be in particular substantially circular and is centered about the axis of rotation 21. The indicator 30, which is capable of pivoting about the axis of rotation 21, runs in the central (radially inner) region approximately at right angles with respect to the axis of rotation 21 and therefore approximately parallel to the display region 20. In the radially outer region, the pivotable indicator 30 extends radially outward from the outer edge 22 of the display region 20, substantially at right angles, with the result that the radially outer region of the pivotable indicator 30, when viewed from the viewing direction 11, is visible radially on the outside at the display region 20. It is also possible (but not illustrated) for the pivotable indicator 30 to reach no further radially than the outer edge 22 of the display region 20. When viewed from the viewing direction 11, the design of the display apparatus 10 is provided in such a way that the display region 20, then the pivotable indicator 30 and subsequently the printed circuit board 40 are provided in a first plane (closer to the viewing direction 11).

In the third embodiment of the display apparatus 10 according to the invention, preferably only the first illumination device 41 is provided, which both emits first light 45 in the direction toward the display region 20 and injects further light 55, into the second light guide region 32 of the pivotable indicator 30. In the third embodiment, the first illumination device 41 is arranged on the printed circuit board 40. In this case, as in the two previously described embodiments, the first light 45 needs to traverse the plane of the pivotable indicator 30, which is in turn realized in such a way that, in addition to the second light guide region 32, the first light guide region 31 is provided in the indicator 30, through which first light guide region 31 the first light 45 is transported from the first illumination device 41 in the direction toward the display region 20. The first light guide region 31 is in turn in particular provided as a central region of the pivotable indicator 30 which is provided so as to be centered around the axis of rotation 21. The second light guide region 32 is provided in the pivotable indicator 30, in particular radially on the outside, and is used for the conduction or for the transmission of the further light 55' to the outer region 35 of the pivotable indicator 30. It is particularly advantageous in accordance with the third embodiment of the invention that the first illumination device 41 is sufficient for illuminating both the first light guide region 31 and the second light guide region 32. In particular, the cap which is otherwise conventional on the flush indicator (not illustrated) is therefore dispensed with.

As an alternative to the variant of the third embodiment illustrated in FIGS. 4 and 5, provision may also be made for a second illumination device (not illustrated in FIGS. 4 and 5) to be arranged on the printed circuit board 40 in addition to the first illumination device 41, with the result that the further light 55' is injected by the second illumination device into the second light guide region 32. The fitting of the first illumination device 41 and possibly also of the second illumination device 51 can therefore be carried out in a particularly simple and cost-effective manner in accordance with the third embodiment.

In the third embodiment as well, the display apparatus 10 has the fiberoptic element 25 for the transport or for the transmission of the first light 45 starting from a plane above the central part of the pivotable indicator 30. Furthermore, as in the first and second embodiment, it is also possible in the third embodiment for the display region 20 to be implemented by a display layer or a sheet layer, which is applied to the disk-like light guide 25, it being possible, for example, for scale marks or the like to be implemented on the sheet (not illustrated) which can also be seen in darkness if the first light 45 emerges from the disk-like light guide 25 in the direction toward the display region 20 or at the edge thereof. In the third embodiment as well, when embodying the display region 20 and the disk-like light guide 25 provision can either be made for the two to be provided so as to be directly adjacent to one another and/or connected, for example adhesively bonded or fixed in some other way, or else for the two to be provided so as to be spaced apart from one another, for example for the display region 20 to be arranged at a comparatively short distance (so as to avoid excessive stray losses) above (i.e. offset in the direction toward the viewing direction 11) the disk-like light guide 25. Furthermore, in the third embodiment, a motor 60 is also arranged below the printed circuit board 40. By means of the motor 60 it is possible to rotate both the pivotable indicator 30 and the further indicator, which is merely indicated by the reference symbol 70 in FIG. 5, independently of one another about the axis of rotation. In accordance with the invention, in the third embodiment as well provision may be made for the further indicator 70 to likewise be illuminated by the first illumination device 41 or for the first light 45 to also be used for illuminating the further indicator 70. In accordance with the invention, it can furthermore also be provided that the first illumination device 41 comprises two groups of light-emitting diodes or generally light sources, the first group of the first illumination device 41 only illuminating the display region 20, and the second group of the first illumination device 41 only illuminating the further indicator 70. This makes it possible to illuminate the further indicator 70 and the display region 20 differently, for example in different colors or the like. With such a separate illumination of the display region 20, on the one hand, and the further indicator 70, on the other hand, via the first or second group of light sources of the first illumination device 41, the invention in particular provides (but this is not illustrated in the figures) that the second group of light sources is provided so as to be arranged on the inside, i.e. closer to the axis of rotation 21, when viewed in the radial direction, and the first group of light sources is provided so as to be arranged on the outside, i.e. further away from the axis of rotation 21, when viewed in the radial direction. However, this different illumination of the display region 20 and the further indicator 70 is not essential in accordance with the invention. It can also be provided, as described at the outset, that both the display region 20 and the further indicator 70 are illuminated substantially in a similar manner, i.e. in the same color, by means of the first illumination device 41. In accordance with the invention, in the case of the third embodiment as well it is possible both in the case of the first illumination device 41 and in the case of the second illumination device 51 for only one or else a plurality of light-emitting diodes or other light sources to be used.

LIST OF REFERENCE SYMBOLS

10 Display apparatus
11 Viewing direction
20 Display region
21 Axis of rotation
22 Edge of display region
25 Disk-like light guide
30 Indicator
31 First light guide region
32 Second light guide region
35 End section of indicator
40 Printed circuit board
41 First illumination device
45 First light
50 Contact-making means
51 Second illumination device
52 Plug-type connection
55 Second light
55' Further light
60 Motor
70 Further indicator

The invention claimed is:

1. A display apparatus for a motor vehicle with a display region, which faces the viewing direction, an indicator, which is capable of pivoting about an axis of rotation, being provided behind the display region in the viewing direction, characterized in that a second illumination device, which is provided so as to be fixed directly or indirectly to the pivotable indicator, is provided, the indicator having a second light guide region for the transmission of second light emerging from the second illumination device, a printed circuit board with a first illumination device provided thereon being provided behind the pivotable indicator in the viewing direction the pivotable indicator having a first light guide region for the transport of first light emerging from the first illumination device to the display region or to an outer edge of the display region.

2. The display apparatus of claim 1, characterized in that the second illumination device, which is provided so as to be fixed directly or indirectly to the pivotable indicator, or the first and second illumination devices, which are provided so as to be fixed directly or indirectly to the pivotable indicator, is/are provided in such a way that electrical contact is made with it/them by means of a contact-making means, in particular a flexible printed circuit board, which compensates for the pivoting movement of the pivotable indicator about the axis of rotation.

3. The display apparatus of claim 2, characterized in that a printed circuit board is provided behind the pivotable indicator in the viewing direction, the contact-making means being provided so as to be mechanically connected to the printed circuit board by means of a plug-type connection, in particular an LIF plug-type connection or a ZIF plug type connection.

4. The display apparatus of claim 1, characterized in that the first illumination device is arranged radially further inward relative to the axis of rotation, and in that the second illumination device is arranged radially further outward relative to the axis of rotation.

5. The display apparatus of claim 1, characterized in that a further indicator, which is likewise capable of pivoting about the axis of rotation, is provided in front of the display region in the viewing direction, in particular it being provided that the further pivotable indicator is provided so as to be illuminated by a second group of light sources of the first illumination device which are arranged preferably radially closer to the axis of rotation, and in particular it being provided that the display region is provided so as to be illuminated by a first group of light sources of the first illumination device which are arranged so as to be spaced apart preferably radially further from the axis of rotation in comparison with the second group.

6. The display apparatus of claim 5, characterized in that the indicator and the further indicator are provided so as to be capable of pivoting about the axis of rotation independently of one another.

7. The display apparatus of claim 1, characterized in that the display region is a dial.

8. The display apparatus of claim 1, characterized in that the first illumination device or the second illumination device (51) comprises one or more light-emitting diodes.

9. The display apparatus of claim 1, characterized in that the first light and the second light are of different colors.

10. A display apparatus for a motor vehicle with a display region, which faces the viewing direction, an indicator, which is capable of pivoting about an axis of rotation, being provided behind the display region in the viewing direction, characterized in that a second illumination device, which is provided so as to be fixed directly or indirectly to the pivotable indicator, is provided, the indicator having a second light guide region for the transmission of second light emerging from the second illumination device, a first illumination device, which is likewise provided so as to be fixed directly or indirectly to the pivotable indicator, being provided, the transmission of first light emerging from the first illumination device to the display region or to an outer edge of the display region being provided.

11. A display apparatus for a motor vehicle with a display region, which faces the viewing direction, an indicator, which is capable of pivoting about an axis of rotation, being provided behind the display region in the viewing direction, characterized in that a printed circuit board with a first illumination device provided thereon is provided behind the pivotable indicator in the viewing direction, the pivotable indicator having a first light guide region for the transport of first light emerging from the first illumination device to the display region or to an outer edge of the display region, the indicator having a second light guide region for the transmission of second light emerging from a second illumination device, wherein the first illumination device is arranged radially further inward relative to the axis of rotation and wherein the second illumination device is arranged radially further outward relative to the axis of rotation.

* * * * *